(12) United States Patent
Bombacino et al.

(10) Patent No.: US 9,332,384 B2
(45) Date of Patent: May 3, 2016

(54) OBTAINING A GEOGRAPHICAL POSITION OF A MOBILE DEVICE

(71) Applicant: GLOBALFOUNDRIES Inc., Grand Cayman (KY)

(72) Inventors: Vinicio Bombacino, Rome (IT); Leonardo Lanni, Rome (IT); Nicola Milanese, Rome (IT); Riccardo Pizzutilo, Rome (IT); Andrea Tortosa, Rome (IT)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 14/503,878

(22) Filed: Oct. 1, 2014

(65) Prior Publication Data
US 2015/0099535 A1    Apr. 9, 2015

(30) Foreign Application Priority Data

Oct. 8, 2013  (GB) .................................. 1317740.7

(51) Int. Cl.
*H04W 4/02* (2009.01)
*H04B 1/7156* (2011.01)

(52) U.S. Cl.
CPC ............... *H04W 4/02* (2013.01); *H04B 1/7156* (2013.01)

(58) Field of Classification Search
CPC ....................................................... H04W 4/02
USPC ......... 455/456.1, 456.3, 456.6, 457, 41.1, 43, 455/404.2; 375/132, 134, 135, 136, 137
See application file for complete search history.

(56) References Cited

U.S. PATENT DOCUMENTS

| | | |
|---|---|---|
| 6,246,376 B1 | 6/2001 | Bork et al. |
| 6,504,503 B1 | 1/2003 | Saint-Hilaire et al. |
| 6,931,051 B2 * | 8/2005 | Nafie ................... H04B 1/7156 375/136 |
| 6,995,708 B2 | 2/2006 | Schmidt |
| 7,688,260 B2 | 3/2010 | Pomerantz et al. |

(Continued)

FOREIGN PATENT DOCUMENTS

| | | |
|---|---|---|
| EP | 1292844 | 3/2003 |
| WO | 0158098 | 8/2001 |

OTHER PUBLICATIONS

Alexandre Barreira et. al "Collaborative Localization of Mobile Users with Bluetooth: Caching and Synchronisation", ACM New York, NY, USA, ACM SIGBED Review—Special Issue on the 3rd International Workshop on Networks of Cooperating Objects (CONET 2012), vol. 9 Issue 3, Jul. 2012, pp. 29-31.

(Continued)

*Primary Examiner* — Cong Tran
(74) *Attorney, Agent, or Firm* — Heslin Rothenberg Farley & Mesiti P.C.

(57) ABSTRACT

A method obtains a geographical position of a mobile device, which comprises a Bluetooth transceiver and a storage unit for storing an offline map. The mobile device establishes Bluetooth capability in order to enable a Bluetooth connection with the mobile device. The mobile device, via the Bluetooth connection, requests geographical coordinates using two bits of a Frequency Hopping Synchronization data packet of the Bluetooth protocol. The mobile device, via the Bluetooth connection, receives geographical coordinates, and maps the received geographical coordinates to the offline map in order to obtain the geographical position of the mobile device in the offline map.

12 Claims, 6 Drawing Sheets

(56) References Cited

U.S. PATENT DOCUMENTS

| | | |
|---|---|---|
| 7,769,393 B2 | 8/2010 | Jendbro et al. |
| 8,243,771 B2 | 8/2012 | Lee et al. |
| 2003/0018744 A1 | 1/2003 | Johanson et al. |
| 2009/0177399 A1 | 7/2009 | Park et al. |
| 2012/0235812 A1 | 9/2012 | Maia et al. |
| 2012/0276897 A1* | 11/2012 | Kwon .................. H04B 1/1027 455/423 |
| 2013/0058306 A1* | 3/2013 | Noh ...................... H04L 1/1671 370/329 |
| 2013/0188538 A1* | 7/2013 | Kainulainen ............. G01S 3/48 370/310 |
| 2013/0278462 A1 | 10/2013 | Burrell et al. |

OTHER PUBLICATIONS

Gelzayd, Y. "An Alternate Connection Establishment Scheme in the Bluetooth System", Master's Thesis, Polytechnic University, Jan. 2002, pp. 1-62.

\* cited by examiner

OBTAINING A GEOGRAPHICAL POSITION OF A MOBILE DEVICE

BACKGROUND

The invention relates generally to a method for obtaining a geographical position of a mobile device. The invention relates further to a first mobile device, a second mobile device and a system of mobile devices, and a computer program product.

Mobile devices, e.g., in form of smartphones, play a major role in today's consumer and professional life. In particular, mobile devices being equipped with a GPS receiver (Global Positioning System) may map the position of the mobile device on a displayed map on a screen of the mobile device. Users of those devices can directly recognize were they are in a given environment.

However, some mobile phones or, more generally, mobile devices are not provided with a GPS receiver that allows obtaining geographical coordinates and to localize the mobile phone and thus, its user in its geographical environment. Typically, this is the case with cheap mobile phones, not so recent mobile phones or, mobile phones thought only to act as phones (and not as a smartphone). Such mobile phones may be used, e.g., by service personnel.

These mobile phones, even if equipped with maps, cannot provide the exact work position he/she is because the GPS function is missing.

Known prior art describes a GPS function in connection with a Bluetooth connectivity.

Known prior are discloses a method of providing an estimate of the location of a first device comprising the steps of determining the location of the separately housed, second device located near to the first device; providing the location of the second device to the first device; and using the location of the second device as an estimate of the location of the first device.

Known prior art discloses an apparatus and a method to determine the position of a wireless device with Bluetooth capabilites. The method relies on transforming positioning information between devices using Bluetooth technology. If one of these devices "knows" its position because it is in a fixed position or because it has a GPS receiver, then this positioning information can be transferred to other devices in the RF (radio frequency) proximity.

However, mobile devices are subject to relative high power requirements. Known technologies do not yet focus on saving battery power when using remote positioning technologies. Therefore, there is a need for a low-power communication between mobile devices when one mobile device tries to position itself using GPS coordinates of another mobile device.

SUMMARY

In one embodiment of the present invention, a method obtains a geographical position of a mobile device, which comprises a Bluetooth transceiver and a storage unit for storing an offline map. The mobile device establishes Bluetooth capability in order to enable a Bluetooth connection with the mobile device. The mobile device, via the Bluetooth connection, requests geographical coordinates using two bits of a Frequency Hopping Synchronization data packet of the Bluetooth protocol. The mobile device, via the Bluetooth connection, receives geographical coordinates, and maps the received geographical coordinates to the offline map in order to obtain the geographical position of the mobile device in the offline map.

In one embodiment of the present invention, a mobile device comprises: a Bluetooth transceiver; and a storage unit for storing an offline map, wherein the Bluetooth transceiver is adapted for establishing a connection involving the mobile device, and wherein the mobile device comprises: a geographical coordinates requesting unit adapted for requesting geographical coordinates by using two bits of a Frequency Hopping Synchronization data packet of Bluetooth protocol, a geographical coordinates receiving unit adapted for receive geographical coordinates, and a mapping unit adapted for mapping received geographical coordinates to the offline map for obtaining the geographical position of the mobile device in the map.

In one embodiment of the present invention, a mobile device comprises: a Bluetooth transceiver and a global positioning receiver for providing geographical coordinates of the mobile device; a detection unit adapted for detecting a request for the geographical coordinates of the mobile device; and a geographical coordinates providing unit adapted for sending the geographical coordinates of the mobile device as a data packet using the Bluetooth transceiver, wherein the detection unit of the mobile device is adapted to use two bits of Frequency Hopping Synchronization data packet of Bluetooth protocol for signaling the ability of the second mobile device to provide requested geographical coordinates of the mobile device.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
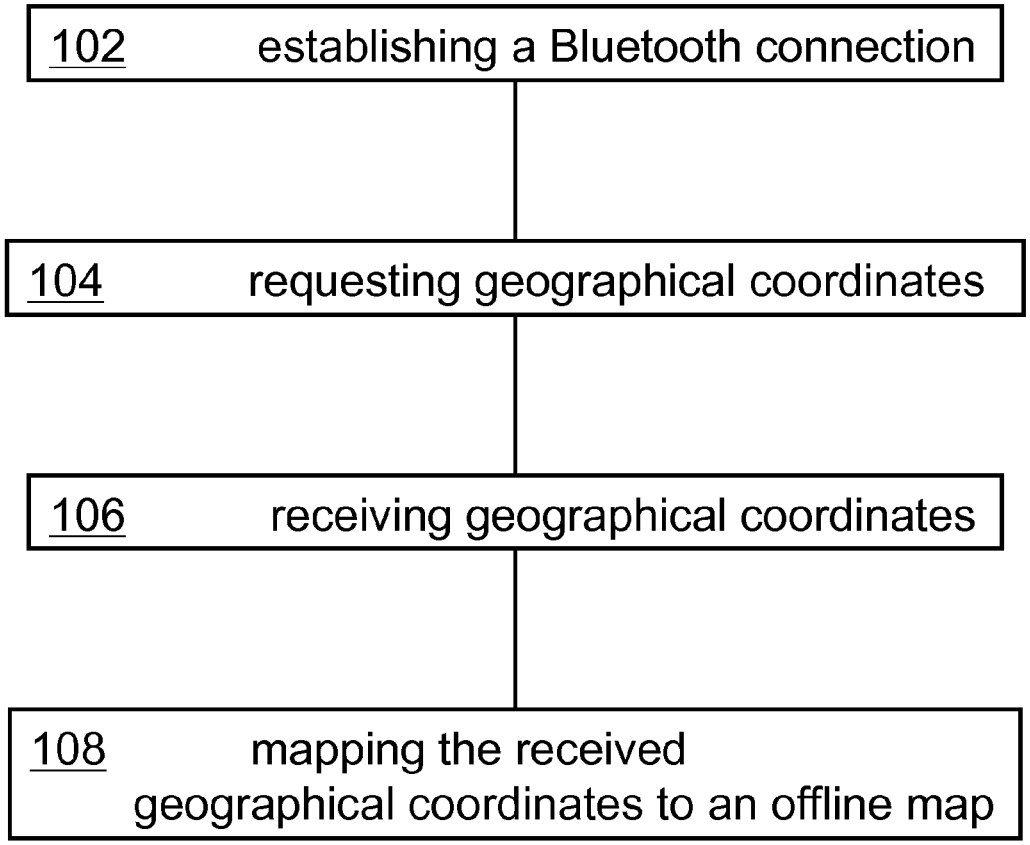
FIG. 1 shows a block diagram of steps of the proposed method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the context of this description, the following conventions, terms and/or expressions may be used:

The term "mobile device" may denote any mobile device, typically used and carried around by a moving person. The mobile device may be a mobile phone or a smartphone, typically equipped with a screen, a transceiver module to a mobile network and optionally with a transceiver for an additional short distance communication using, e.g., a Bluetooth transceiver.

The term "Bluetooth" and related protocols and technologies may denote a wireless communication standard for exchanging data over short distances in, e.g., the industrial, scientific and medical (ISM) radio bands from 2400 to 2480 MHz. Using Bluetooth technologies, personal area networks or piconets may be built. Today, the Bluetooth specifications are managed by the Bluetooth Special Interest Group (SIG) which defines the complete Bluetooth protocol stack.

A "Bluetooth connection" may—in the context of this document—denote a wireless communication connection using Bluetooth technology and protocols between mobile devices, in particular mobile devices like e.g., mobile phones.

The term "transceiver" may denote a device comprising both, a transmitter and a receiver which may be combined and share common circuitry. Transceivers may be available for different radio frequencies, e.g., the ISM bands, in particular for Bluetooth communication, and frequencies for telephone communication typically used by mobile telephones.

The term "Frequency Hopping Synchronization" (FHS) may denote a mechanism within the Bluetooth communication protocol enabling a continuous communication between Bluetooth devices by switching constantly between sub-bands of the Bluetooth frequency spectrum. For enabling such synchronization, FHS data packets may permanently be sent back and forth between communicating mobile devices using the Bluetooth technology.

The term "geographical position" may denote a physical position of a person within a given geographical environment, e.g., in global coordinates from a global positioning system.

The term "offline map" may denote a map or an electronic representation stored in a storage unit of, e.g., a mobile device like a smartphone. Using coordinates, e.g., global positioning coordinates received from a satellite, a position of a mobile device, i.e., its user, may be determined by relating the map and the coordinates to each other. "Offline" may mean that the map describing data may be stored locally within the mobile device and no online connection may be required to display the offline map on a screen of the mobile device. However, to obtain real-time coordinates, typically a triangulation of received satellite signals maybe required.

The proposed method for obtaining a geographical position of a mobile device and the related devices may offer a couple of advantages:

By using the proposed method and the related devices a general synchronization between mobile devices to request, provide and transmit geographical coordinates between mobile devices may be performed without any communication overhead and without the requirement for additional battery power. "Empty spaces" in communication protocol packets of the Bluetooth technology may be used to transmit a request for geographical coordinates. Also an answer of a second mobile device to provide information about available geographical coordinates may be transmitted without any communication overhead and thus, without any additional power requirements. This means that no additional communication packets—in particular, in addition to typical synchronization data packets of the Bluetooth protocol—may be transmitted between a first and a second mobile device in order to exchange the request and information about the availability of GPS coordinates. Only in case the second mobile device may be able to provide geographical coordinates to a first mobile device, the geographical coordinates may be transmitted in a payload packet of the Bluetooth protocol.

This technology may be included in mobile devices having no GPS receiver, thus, enabling a user using the mobile device to position himself within his geographical environment and in addition doing this with little power requirements. Thus, existing resources and mobile devices—on the requester and the provider side for geographical coordinates—may be used more efficiently. This applies, in particular, to energy and communication bandwidth requirements. Battery power of the mobile devices may be saved. And a mobile phone not having a GPS receiver may show a geographical map of a nearby mobile phone, having a GPS receiver, as an approximation of its own geographical position.

According to one embodiment of the method, the establishing a Bluetooth connection may comprise establishing a plurality of Bluetooth connections with the mobile device, in particular to a plurality of other mobile devices. That way, the first mobile device may receive a plurality of geographical coordinate pairs (geographical latitude and longitude) from surrounding second mobile devices, all equipped with GPS receivers. The first mobile device may then use a triangulation technique to determine its own position even better. In case only one second mobile device may deliver geographical coordinates to the first mobile device, these coordinates may be used as an approximation of the geographical coordinates of the first mobile device.

According to an enhanced embodiment of the method the requesting geographical coordinates may comprise waiting for a signal for a predetermined time, wherein the signal notifies the first mobile device about an availability of the requested geographical coordinates using two bits of the Frequency Hopping Synchronization data packet of the Bluetooth protocol. This way a proper timeout condition may be controlled.

According to a further embodiment of the method, the receiving geographical coordinates may comprise receiving the geographical coordinates within a predefined amount of time after requesting the geographical coordinates explicitly. This may allow for a proper timeout condition to be met. If not any geographical coordinates may be received within a predetermined amount of time the first mobile device may determine that—in contrast to the received indication that geographical coordinates may be available—no second mobile devices may be in the surrounding area any more having GPS receiver on board. Or, the second mobile systems may not be enabled to communicate via the two bits of the FHS data packet.

According to a useful embodiment of the method, the two bits of the Frequency Hopping Synchronization data packet of the Bluetooth protocol are bit 58 and bit 59 out of bits 0 to 143 of the Frequency Hopping Synchronization data packet. According to the Bluetooth specification, these bits may not be used under normal Bluetooth protocol conditions. By using these two bits a clear messaging mechanism between mobile devices may be given for any Bluetooth communication involving requests for geographical coordinates and indications about the availability of geographical coordinates.

If the first mobile device may request geographical coordinates from a second mobile device which may be in a Bluetooth communication with one and another, the first mobile device may set bit 58 and bit 59 of the FHS data packet to "1". The second mobile device may—using another FHS data packet—answer with, e.g., bit 58="0". In this case the second mobile device may not be enabled to deliver geographical coordinates at all. If bit 58="1" and bit 59="0", the second mobile device may generally be able to deliver geographical coordinates from its GPS receiver or from fixed programmed coordinates because the second device may be a stationary device. But due to inhibiting circumstances, the second mobile device may not be able to transmit any actual coordinates. This may, e.g., be the case if no GPS satellite may be available so that no position triangulation may be possible for the second mobile device.

If in the answer of the second mobile device bit 58=bit 59="1" then the second mobile device may be able to provide geographical coordinates of the position of the second mobile device. These may be requested separately and explicitly by the first mobile device in a payload data packet or, the second mobile device may be enabled to transmit geographical coordinates automatically after a time period in a separate data packet to the first mobile device.

According to an enhanced embodiment, the method may also comprise detecting the request for the geographical coordinates of the mobile device by a second mobile device, and sending the geographical coordinates of the second mobile device as a data packet using a Bluetooth transceiver of the second mobile device. Also here, two bits of the Frequency Hopping Synchronization data packet of the Bluetooth protocol may be used for signaling an ability of the second mobile device to provide the requested geographical coordinates of the second mobile device. The two devices may stay in synch regarding the request and potential response for geographical coordinates via the Bluetooth connection and the already mentioned bits in the FHS data packet.

As mentioned above in the context of the method, also the related devices may make use of bit 58 and bit 59 of the 143 bits of the Frequency Hopping Synchronization data packet of the Bluetooth protocol. This is a lightweight, no overhead bearing data exchange (request/signals of ability) using existing transmitted data packets.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for obtaining a geographical position of a mobile device is given. Afterwards, further embodiments of the method as well as the related first mobile device and second mobile device will be described.

FIG. 1 shows a block diagram of steps of the proposed method 100 for obtaining a geographical position of a first mobile device. The first mobile device may comprise Bluetooth transceiver and a storage unit for storing an offline map. The method 100 may comprise establishing 102 a Bluetooth connection involving the mobile device and requesting 104 geographical coordinates using two bits of the Frequency Hopping Synchronization data packet of the Bluetooth protocol by the mobile device. The method 100 may also comprise receiving 106 geographical coordinates by the mobile device. These or an indication about the ability of a second mobile device to deliver geographical coordinates may be signaled to the first mobile device. After receiving, 106, the geographical coordinates at the first mobile device, a mapping, 108, of the received geographical coordinates to the offline map for obtaining the geographical position of the mobile device in the map may be performed, in order to obtain an approximation of a geographical position of the first mobile device. It may be assumed that the first and second mobile device may be close enough to each other to assume that—within a certain surrounding—both geographical positions of the two mobile devices are more or less the same.

Figure 2:
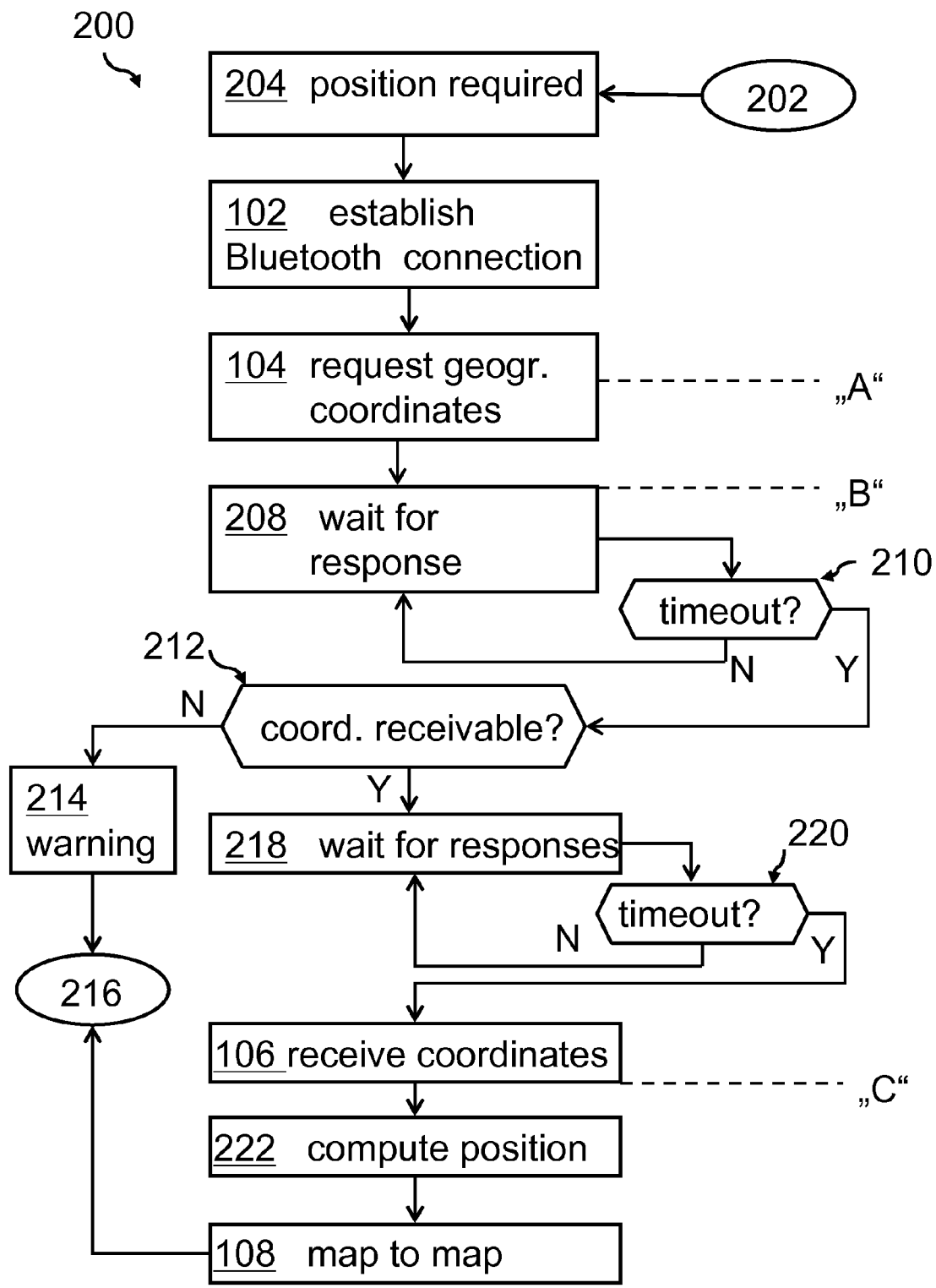
FIG. 2 shows a flowchart with steps executable in a first, geographical coordinates requesting mobile device.

FIG. 2 shows a block diagram of a flowchart 200 of the method 100 with more detailed steps executable in a first, geographical coordinates requesting mobile device. The flowchart may start at 202. Firstly, it may be determined, that the geographical position may be required, 204. The first mobile device may establish, 102, the Bluetooth connection to one or more of the other mobile devices in the surrounding of the requesting mobile device. As part of establishing the Bluetooth connection to a second mobile device, the first mobile device may request, 104, geographical coordinates from the second mobile device. This may be performed using the FHS data packet having bit 58 and bit 59 set to "1", as explained above and detailed below.

Figure 3:
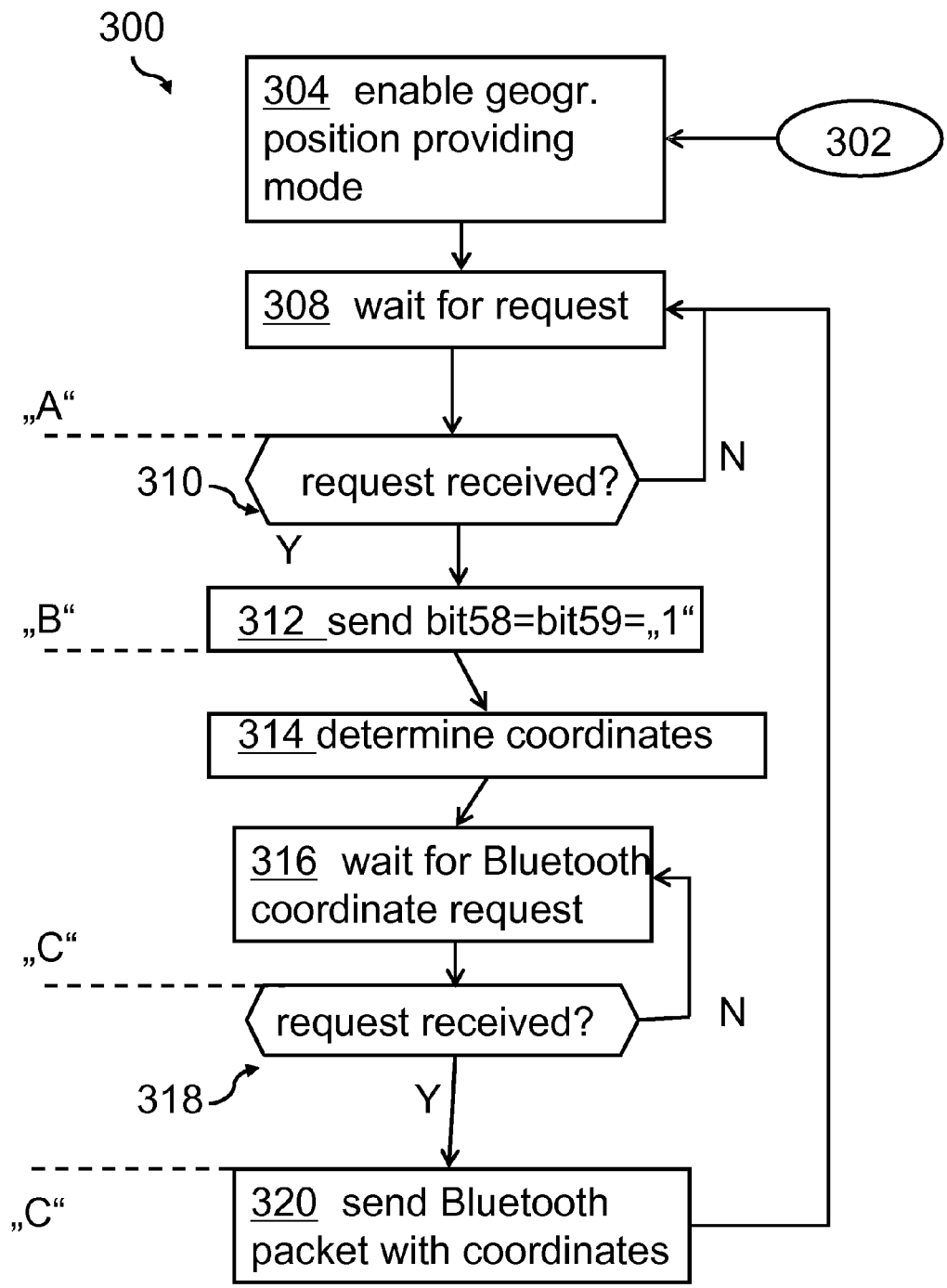
FIG. 3 shows a flowchart with steps executable in a second, geographical coordinates providing mobile device.

The dashed line connected to block 104 with an "A" at its right side may symbolize a logical connection and synchronization point to the flowchart detailed in FIG. 3 also showing an "A". The same applies for logical connection or synchronization points "B" and "C" between FIG. 2 and FIG. 3.

At 208 the first mobile device may wait for a response from one or more of the mobile devices signaling in the FHS data packet of the Bluetooth protocol that they may be ready to provide geographical coordinates to the first mobile device. Potential providing mobile devices may respond to the request of the first mobile device also using bit 58 and bit 59 all of the FHS data packet.

If bit 58 may be set to "0" it may signal that the second mobile device may not be able to provide geographical coordinates to requesting peer devices. If bit 58 may be set to "1" and bit 59 may be set to "0" it may signal that the second mobile device may provide geographical coordinates to requesting peer devices, but that the geographical coordinates are not available at the current, requesting moment.

If bit 58 may be set to "1" and bit 59 may also be set to "1", it may signal that the second mobile device may provide the geographical coordinates to requesting peer devices.

At 208, the first mobile device may wait for a response of any second mobile device and a timeout condition 210 may be controlled. In case the timeout condition may be fulfilled, the flowchart continues at 212 by checking whether a signal may have been received indicating that geographical coordinates may be receivable. In case of "NO", a warning may be displayed, 214, to the user of the first mobile device and the flowchart may end at 216.

In case of an indication that geographical coordinates may be receivable, the first mobile device may wait for a response comprising geographical coordinates, 218, for a certain amount of time. In case a timeout condition may be fulfilled, 220, available geographical coordinates may explicitly be requested and received, 106. Based on this, a geographical position of the first mobile device using all received geographical positions from other, peer mobile devices may be computed, 222, and may be mapped to a geographical map, 108, for displaying it on a screen of the first mobile device. The flowchart may again end at 216.

FIG. 3 shows a block diagram of a flowchart 300 with steps executable in a second, geographical coordinates providing mobile device. The flowchart may start at 302. Firstly, a geographical position providing mode may be enabled, 304. At 308, the second mobile device may wait for a request for providing geographical coordinates in bit 58 and bit 59 of the FHS data packet. If a request may have been received, 310, the second mobile device may respond with set or reset bit 58 and bit 59, as explained above and as shown at 312. If bit 58=bit 59="1", the second mobile device executing the method according to FIG. 3 is ready to provide the geographical coordinates of the second mobile device. In this case, the geographical coordinates may be determined, 314, and the second mobile device may wait, 316, for an explicit request to transmit the geographical coordinates of the second mobile device or, may transmit the geographical coordinates automatically depending on the implementation. As such an explicit request may be received, 318, the second mobile device may send, 320, a payload data packet comprising the geographical coordinates of the second mobile device using the Bluetooth protocol via the Bluetooth transceiver. The method may then continue at 308, so that the second mobile device waits for another request.

Figure 4:
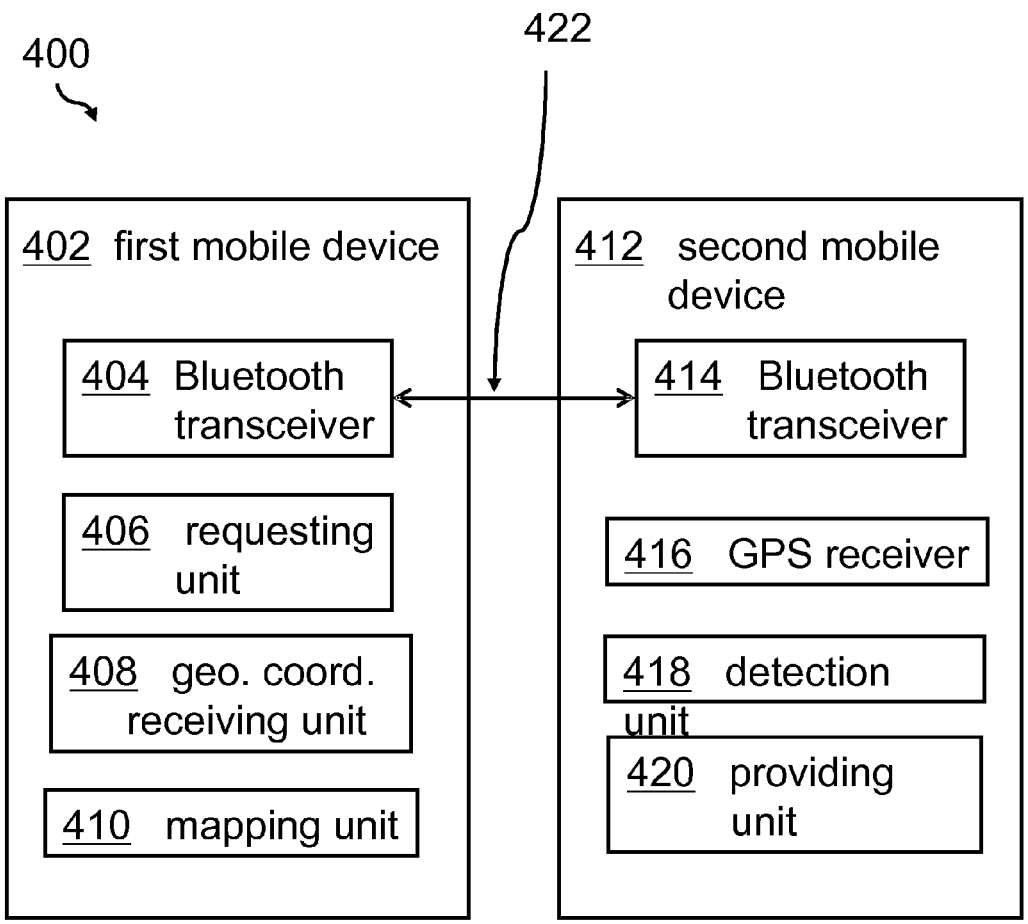
FIG. 4 shows block diagrams of a first and a second mobile device with elements useful for executing the proposed method.

FIG. 4 shows block diagrams 400 of a first 402 and a second mobile device 412 with elements useful for executing the proposed method. The first mobile device 402 may comprise a Bluetooth transceiver 404 and a storage unit (not shown, see FIG. 6) for storing an offline map. The Bluetooth transceiver 404 may be adapted for establishing, 102, a Bluethooth connection 422 involving the first mobile device 402. The first mobile device 402 may comprise a geographical coordinates requesting unit 406 adapted for requesting geographical coordinates by using two bits of the Frequency Hopping Synchronization data packet (see FIG. 5) of the Bluetooth protocol, and a geographical coordinates receiving unit 408 adapted for receiving geographical coordinates or an indication about the availability of geographical coordinates from a second mobile device. A mapping unit 410 may be adapted for mapping the received geographical coordinates to the offline map for obtaining the geographical position of the mobile device 402 in the map. In doing so, a user of the first mobile device may be enabled to use the geographical coordinates of a second nearby mobile device as an approximation of its own geographical position. If more than one second mobile device delivers geographical coordinates to the first mobile device, it may use triangulation techniques for determining a better approximation of the own geo-position.

A second mobile device 412 in Bluetooth connection, 422, with the first mobile device 402 may comprise a Bluetooth transceiver 414 and a global positioning receiver 416 for receiving and providing geographical coordinates of the second mobile device 412. A detection unit 418 adapted for detecting a request for the geographical coordinates of the second mobile device 412 may also be present in the second mobile device 412. Via a geographical coordinates providing unit 420, either an indication about the availability of geographical coordinates or the geographical coordinates of the second mobile device, or both, may be sent using the Bluetooth transceiver. The indication about the availability of geographical coordinates may be transmitted via the two mentioned bits in the FHS data packet and the real geographical coordinates may be sent as a payload packet of the Bluetooth connection.

As already mentioned, the detection unit 418 of the second mobile device 412 may be adapted to use the two bits of the Frequency Hopping Synchronization data packet 500 of the Bluetooth protocol for signaling the ability of the second mobile device 412 to provide the requested geographical coordinates of the second mobile device 412.

Figure 5:
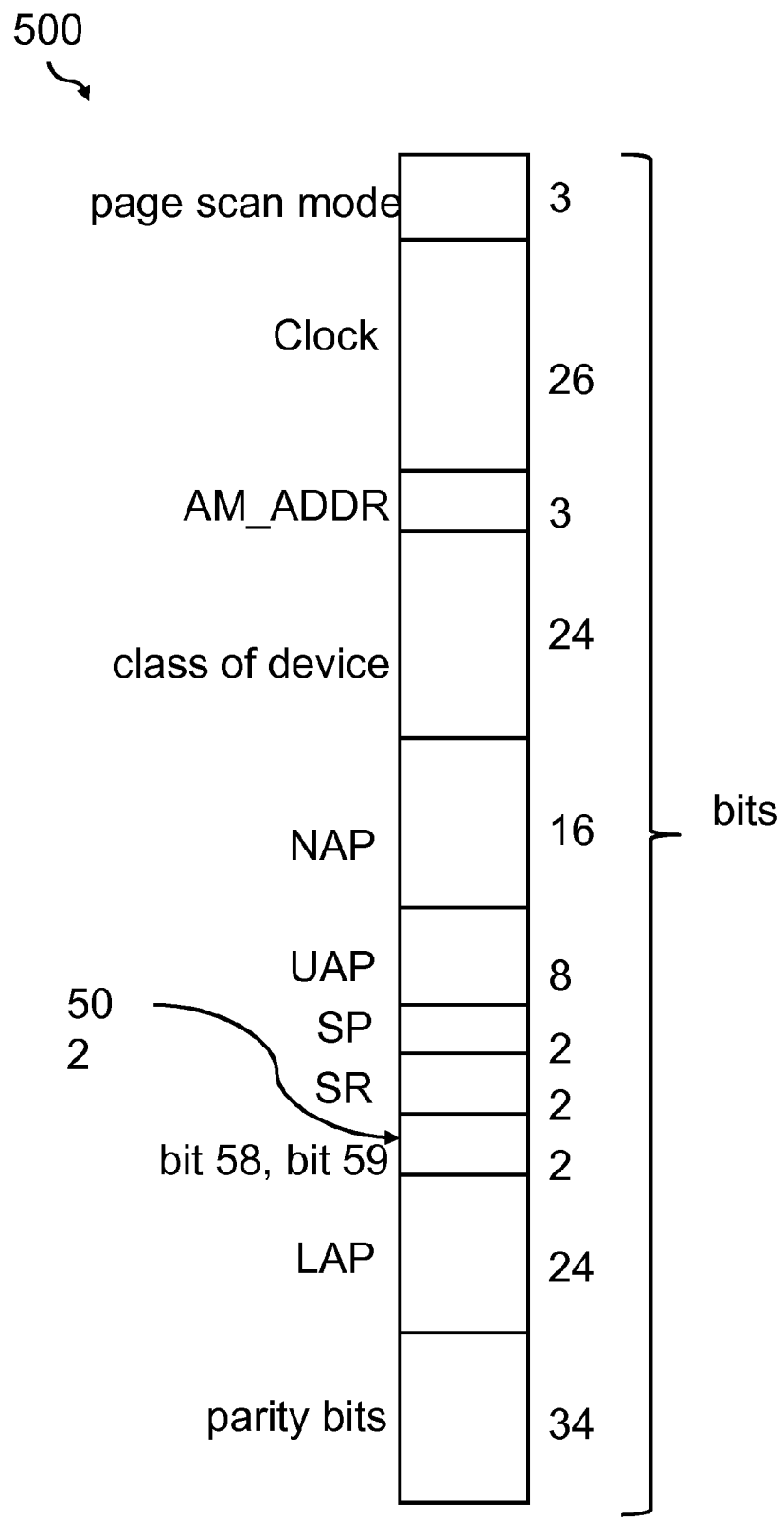
FIG. 5 shows a block diagram of a generic Frequency Hopping Synchronization data packet of the Bluetooth protocol.

FIG. 5 shows a block diagram of a generic Frequency Hopping Synchronization (FHS) data packet 500 of the Bluetooth protocol. As the figure shows, the FHS data packet comprises 144 bits. The count runs from the left side, starting with 0 at the first parity bit and ends with the third bit of the page scan mode field.

As known to a skilled person, the Bluetooth protocol specifications have been developed by the Bluetooth special interest group (SIG). The Baseband and Link Control layer may enable the physical radiofrequency link between Bluetooth devices forming a piconet. As it is also known by a skilled person, the Bluetooth radio frequency system is a Frequency-Hopping-Spread-Spectrum system in which packets are transmitted in defined timeslots on defined frequencies. The Baseband and Link Control layer uses inquiry and paging procedures to synchronize the transmission hopping frequency and clock of different Bluetooth devices. Typically, the basic radio is a hybrid spread spectrum radio. Typically, the radio operates in a frequency-hopping manner in which the 2.5 GHz ISM band is broken into 79 1-MHz-channels that the radio randomly hops through while transmitting and receiving data. Thereby, the FHS data packets are constantly transmitted in both directions. Here, it does not seem to be required to discuss all fields of the FHS data packet. However, the reader may notice that bit 58 and bit 59—compare 502— may not be defined by the Bluetooth protocol specification.

At this point, the here described methods and devices become relevant as they make use of these two bits in the regularly exchanged FHS data packets between communicating Bluetooth devices. Because the FHS data packets are constantly sent back and forth between the devices to enable the above-explained frequency hopping, requests from a first mobile device for geographical coordinates and an ability to provide geographical coordinates from the second mobile device may be transmittable with individual FHS data packets sent without any communication overhead. A potential setting of bit 58 and bit 59 for a request for geographical coordinates and a signaling of an ability to provide geographical coordinates has already been discussed in context of FIGS. 1, 2 and 3.

Figure 6:
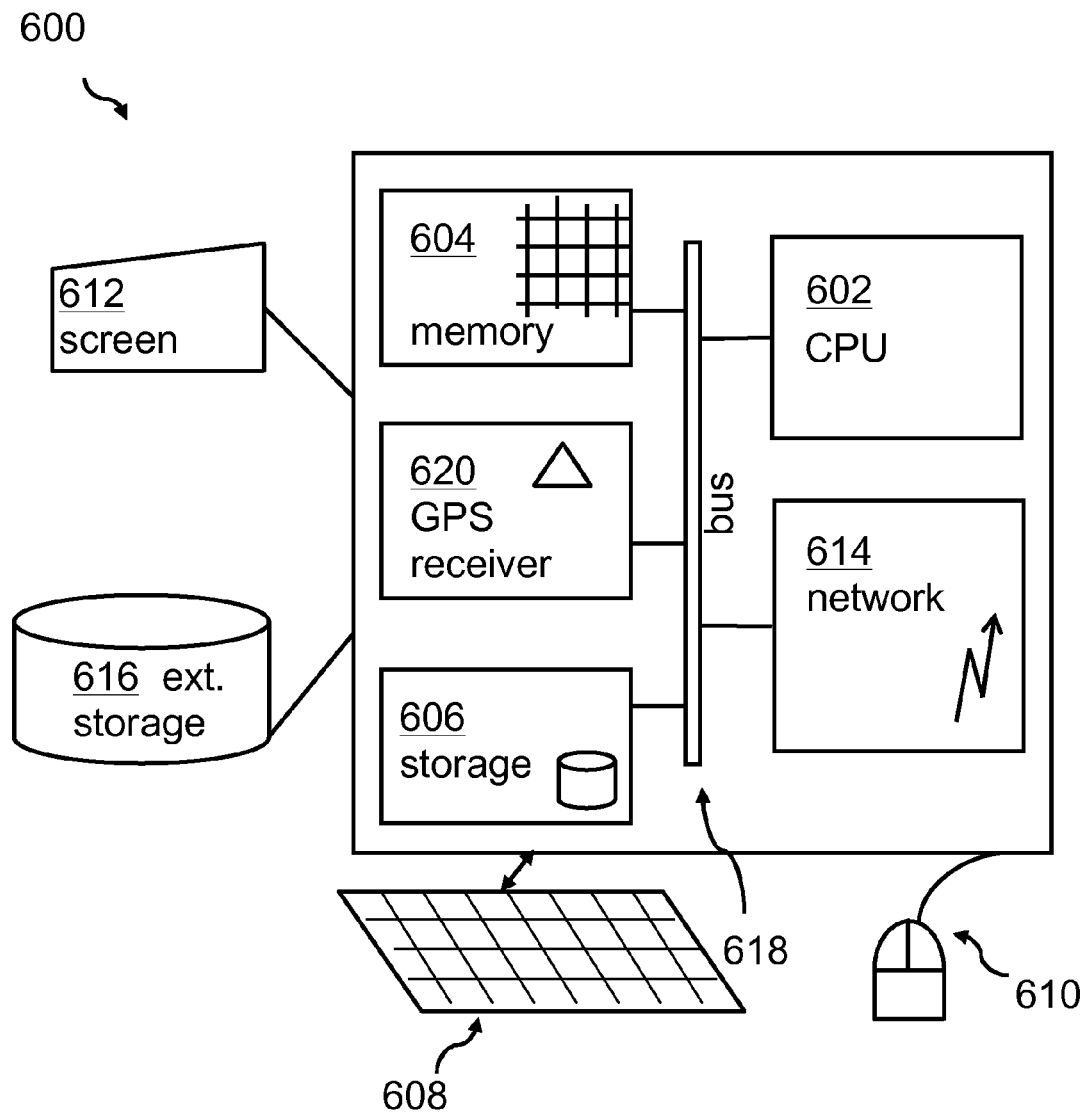
FIG. 6 shows a block diagram of an underlying mobile device.

Embodiments of the invention may be implemented together with virtually any type of mobile device or mobile computer, regardless of the platform being suitable for storing and/or executing program code. Suitable are in particular mobile devices or mobile computing devices like smartphones. The computer discussed from here on may also comprise elements as discussed in the context of FIG. 4. For example, as shown in FIG. 6, a computing system 600, e.g., a mobile device, may include one or more processor(s) 602 with one or more cores per processor, associated memory elements 604, in particular adapted for storing an offline map, an internal storage device 606 in smartphones typically a solid state Disk (SSD) (or alternatively or together with, e.g., a hard disk, an optical drive such as a compact disk drive or digital video disk (DVD) drive, a flash memory stick, etc.), and numerous other elements and functionalities, typical of today's computers (not shown). The memory elements 604 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 616 for an execution. In smartphones long-term bulk storage may be implemented as smartcards, SD cards (SD=Secure Digital) or, microSD card. Elements inside the computer 600 may be linked together by means of a bus system 618 with corresponding adapters.

The computing system 600 may also include input means, such as a keyboard 608, a pointing device such as a mouse 610, and/or a microphone and a speaker (not shown). Alternatively, the computing system may be equipped with a touch sensitive screen 612 as main input and output device. Furthermore, the computer 600, may include output means, such as a monitor or screen 612 [e.g., a liquid crystal display (LCD), a plasma display, a light emitting diode display (LED), or cathode ray tube (CRT) monitor]. The computer system 600 may be connected to a network (e.g., a local area network (LAN), a wide area network (WAN), such as the Internet or any other similar type of network, including wireless networks via a network interface connection 614. This may allow a coupling to other computer systems or a storage network or a tape drive or a mobile telephone network. Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

A method for obtaining a geographical position of a mobile device may be provided. The mobile device may comprise a Bluetooth transceiver and a storage unit for storing an offline map. The method may comprise establishing a Bluetooth connection, requesting geographical coordinates using two bits of the Frequency Hopping Synchronization data packet of the Bluetooth protocol, receiving geographical coordinates by the mobile device, and mapping the received geographical coordinates to the offline map for obtaining the geographical position of the mobile device in the map.

This need may be addressed by the proposed method for obtaining a geographical position of a mobile device, a related first mobile device, a related second mobile device as well as by a system of mobile devices, a data processing program, and a computer program product according to the independent claims.

According to one aspect, a method for obtaining a geographical position of a mobile device may be provided. The mobile device may comprise a Bluetooth transceiver and a storage unit for storing an offline map. The method may be executed by the mobile device and may comprise establishing a Bluetooth connection involving the mobile device and requesting via the Bluetooth connection geographical coordinates using two bits of the Frequency Hopping Synchronization data packet of the Bluetooth protocol by the mobile device. Further, the method may comprise receiving geographical coordinates via the Bluetooth connection by the mobile device, and mapping the received geographical coordinates to the offline map for obtaining the geographical position of the mobile device in the map.

According to another aspect, a first mobile device may be provided. The first mobile device may comprise a Bluetooth transceiver and a storage unit for storing an offline map. The Bluetooth transceiver may be adapted for establishing a connection—in particular, a Bluetooth connection—involving the first mobile device, in particular to at least a second mobile device. The first mobile device may comprise a geographical coordinates requesting unit adapted for requesting geographical coordinates by using two bits of the Frequency Hopping Synchronization data packet of the Bluetooth protocol, and a geographical coordinates receiving unit adapted for receiving geographical coordinates. The first mobile device may also comprise a mapping unit adapted for mapping the received geographical coordinates to the offline map for obtaining the geographical position of the mobile device in the map.

According to a further aspect, a second mobile device of mobile devices may be provided. The second mobile device may comprise a Bluetooth transceiver and a global positioning receiver for providing geographical coordinates of the second mobile device. The second mobile device may comprise a detection unit adapted for detecting a request for the geographical coordinates of the second mobile device, and a geographical coordinates providing unit adapted for sending the geographical coordinates of the second mobile device as a data packet using the Bluetooth transceiver. The detection unit of the second mobile device may be adapted to use two bits of the Frequency Hopping Synchronization data packet of the Bluetooth protocol for signaling an ability of the second mobile device to provide the requested geographical coordinates of the second mobile device.

According to a further aspect, a system of mobile devices may be provided. The system of mobile devices may comprise a first mobile device and a second mobile device. The first mobile device may comprise a Bluetooth transceiver, a requesting unit adapted for requesting geographical coordinates from the second mobile device, a storage unit adapted for storing a geographical map, and a mapping unit adapted for mapping received geographical coordinates from the second mobile device to the stored geographical map. The requesting unit of the first mobile device may be adapted to use two bits of the Frequency Hopping Synchronization data packet of the Bluetooth protocol for requesting the geographical coordinates.

The second mobile device of the system of mobile devices may comprise a Bluetooth transceiver, a global positioning receiver for providing geographical coordinates of the second mobile device, a detection unit adapted for determining that the first mobile device requests geographical coordinates, and a geographical coordinates providing unit adapted for sending the geographical coordinates of the second mobile device to the first mobile device as a data packet using the Bluetooth transceiver. The detection unit of the second mobile device may be adapted to use two bits of the Frequency Hopping Synchronization data packet of the Bluetooth protocol for signaling an ability of the second mobile device to provide the requested geographical coordinates of the second mobile device.

It may be noted that the mentioned maps may be geographical maps. It may also be noted that the Bluetooth communication technology is a short range communication technology so that devices communicating using Bluetooth technologies are in a surrounding of several meters to each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A method for obtaining a geographical position of a mobile device, the mobile device comprising a Bluetooth transceiver and a storage unit for storing an offline map, the method comprising:
   establishing in the mobile device, Bluetooth capability to enable a Bluetooth connection with the mobile device;
   requesting by the mobile device, via the Bluetooth connection, geographical coordinates using two bits of a Frequency Hopping Synchronization data packet of Bluetooth protocol;
   receiving by the mobile device, via the Bluetooth connection, geographical coordinates; and
   mapping, in the mobile device, the received geographical coordinates to the offline map to obtain the geographical position of the mobile device in the offline map.

2. The method according to claim 1, wherein said establishing in the mobile device Bluetooth capability to enable the Bluetooth connection comprises:
   establishing, in the mobile device, a plurality of Bluetooth connections with the mobile device.

3. The method according to claim 1, wherein said receiving, by the mobile device, geographical coordinates comprises:
   receiving, by the mobile device, a plurality of geographical coordinates.

4. The method according to claim 3, further comprising:
   additionally determining, in the mobile device, the geographical position of the mobile device based on the plurality of received geographical coordinates.

5. The method according to claim 1, wherein said requesting by the mobile device, via the Bluetooth connection, geographical coordinates comprises:
   waiting, by the mobile device, for a signal for a predetermined time, wherein the signal notifies the mobile device about an availability of requested geographical coordinates using the two bits of the Frequency Hopping Synchronization data packet of the Bluetooth protocol.

6. The method according to claim 1, wherein the receiving in the mobile device, via the Bluetooth connection, geographical coordinates comprises:
   accepting, by the mobile device, the geographical coordinates only within a predefined amount of time after requesting the geographical coordinates.

7. The method according to claim 1, wherein the two bits of the Frequency Hopping Synchronization data packet of the Bluetooth protocol are bit 58 and bit 59 out of bits 0 to 143 of the Frequency Hopping Synchronization data packet.

8. The method according to claim 1, further comprising:
   detecting said requesting for the geographical coordinates of the mobile device by a second mobile device; and
   sending geographical coordinates of the second mobile device as a data packet using a Bluetooth transceiver of the second mobile device, wherein two bits of the Frequency Hopping Synchronization data packet of the Bluetooth protocol are used for signaling an ability of the second mobile device to provide the requested geographical coordinates of the second mobile device.

9. A mobile device comprising:
   a Bluetooth transceiver; and
   a storage unit for storing an offline map, wherein the Bluetooth transceiver is adapted for establishing a connection involving the mobile device, and wherein the mobile device comprises:
     a geographical coordinates requesting unit adapted for requesting geographical coordinates by using two bits of a Frequency Hopping Synchronization data packet of Bluetooth protocol,
     a geographical coordinates receiving unit adapted for receive geographical coordinates, and
     a mapping unit adapted for mapping received geographical coordinates to the offline map for obtaining the geographical position of the mobile device in the map.

10. The mobile device according to claim 9, wherein the two bits of the Frequency Hopping Synchronization data packet of the Bluetooth protocol are bit 58 and bit 59 of bits 0 to 143 of the Frequency Hopping Synchronization data packet.

11. A mobile device comprising:
   a Bluetooth transceiver and a global positioning receiver for providing geographical coordinates of the mobile device;
   a detection unit adapted for detecting a request for the geographical coordinates of the mobile device; and
   a geographical coordinates providing unit adapted for sending the geographical coordinates of the mobile device as a data packet using the Bluetooth transceiver, wherein the detection unit of the mobile device is adapted to use two bits of Frequency Hopping Synchronization data packet of Bluetooth protocol for signaling the ability of the second mobile device to provide requested geographical coordinates of the mobile device.

12. The mobile device according to claim 11, wherein the two bits of the Frequency Hopping Synchronization data packet of the Bluetooth protocol are bit 58 and bit 59 of bits 0 to 143 of the Frequency Hopping Synchronization data packet.

* * * * *